United States Patent
Hansen et al.

(10) Patent No.: US 7,814,958 B2
(45) Date of Patent: Oct. 19, 2010

(54) ROLL-UP SUNROOF SHADE

(75) Inventors: Melf Hansen, Gondelsheim (DE); Wolfgang Stark, Denkendorf (DE)

(73) Assignee: BOS GmbH & Co. KG, Ostifildern (DE)

(*) Notice: Subject to any disclaimer, the term of this patent is extended or adjusted under 35 U.S.C. 154(b) by 394 days.

(21) Appl. No.: 11/986,262

(22) Filed: Nov. 20, 2007

(65) Prior Publication Data

US 2008/0142172 A1 Jun. 19, 2008

(30) Foreign Application Priority Data

Nov. 20, 2006 (DE) ............. 10 2006 054 881

(51) Int. Cl.
*B60J 7/00* (2006.01)
(52) U.S. Cl. .................. 160/370.22; 160/273.1
(58) Field of Classification Search ........... 160/370.22, 160/273.1; 296/97.8, 98, 100.13, 219, 141, 296/142, 143
See application file for complete search history.

(56) References Cited

U.S. PATENT DOCUMENTS

| | | | | |
|---|---|---|---|---|
| 536,517 A * | 3/1895 | Hahn | ................. | 160/273.1 |
| 2,501,454 A * | 3/1950 | Schueren | ................. | 160/273.1 |
| 2,689,004 A * | 9/1954 | Van Der Horst | ............ | 160/269 |
| 2,811,321 A * | 10/1957 | La Barre | .................. | 242/399.1 |
| 3,768,540 A * | 10/1973 | McSwain | .................. | 160/23.1 |
| 5,205,605 A * | 4/1993 | Haddad, Jr. | .................. | 296/98 |
| 6,179,373 B1 * | 1/2001 | Bohm et al. | ................ | 296/214 |
| 6,186,587 B1 * | 2/2001 | Entenmann | ................ | 296/214 |
| 6,776,211 B2 * | 8/2004 | Schlecht et al. | ........ | 160/370.22 |
| 6,899,380 B2 * | 5/2005 | Kralik et al. | ................ | 296/214 |
| 7,128,125 B2 * | 10/2006 | Harbison | ................ | 160/273.1 |
| 2007/0175603 A1 * | 8/2007 | Lin | ........................ | 160/273.1 |

* cited by examiner

*Primary Examiner*—David Purol
(74) *Attorney, Agent, or Firm*—Leydig, Voit & Mayer, Ltd.

(57) ABSTRACT

A roll-up sunroof shade is provided that includes two guide rails running along the sides of the shade sheet. The shade sheet is cut wider than corresponds to the clear distance between the guide rails. While being pulled out, the shade sheet is forced by an appropriate geometry at the inlet end of the guide rails to form a tube-like loop around a piping member that moves along with it. Due to the wrapping of the piping member, the shade sheet is held in place perpendicular to the longitudinal extent of the guide rail.

20 Claims, 3 Drawing Sheets

ROLL-UP SUNROOF SHADE

FIELD OF THE INVENTION

This invention relates to window shades for motor vehicles.

BACKGROUND OF THE INVENTION

Sunroofs of motor vehicles generally require shading. At practically any position of the sun, light can fall into the interior of the passenger car via the sunroof and thereby heat the interior. Roll-up sunroof shades are used to slow down the heating process. At the same time, they are able to provide light when the sunroof shade is opened.

For roll-up sunroof shades of motor vehicles, there is the problem that the deployed shade sheet sags in a basin shape due to its dead weight between the guide rails and between the pull rod and the winding shaft. One solution to counteract this sagging that has been attempted is reinforcing the blind sheet with a thin steel strip. The steel strip runs in special guide rails, which keep the shade sheet tightened in the transverse direction between the guide rails.

The expense of fastening the steel strips to the edges of the shade sheet is substantial. In addition, such a roll-up shade has the disadvantage that the roll body on the winding shaft is thicker in the area of the steel strips and increases in diameter faster there than in the area between them, which causes creasing. These creases become permanent over time and have an unpleasant appearance when the shade sheet is deployed.

BRIEF SUMMARY OF THE INVENTION

In view of the foregoing, a general object of the present invention is to create a roll-up sunroof shade that does not have the disadvantages of the prior art.

The roll-up sunroof shade for motor vehicles of the present invention includes a rotatably seated winding shaft to which one edge of a shade sheet cut in a rectangular shape is fastened. The other edge of the shade sheet is connected to a pull rod that extends at its ends in two mutually parallel guide rails. Each guide rail contains a guide groove that, when viewed in cross section, consists of a groove chamber and a groove slot. The groove slot of the guide rail points or opens in the direction of the opposite guide rail. Since the width of the groove chamber is larger than the width of the groove slot, an undercut guide groove is produced.

The cut of the shade sheet is selected in such a way that the width of the shade is larger than the distance between the guide rails. With the help of an inclined inlet edge on each guide rail along with piping members, the shade sheet is wrapped around the piping member in loop-like or hose-like manner at the inlet edge of each guide rail. Inside the guide rail, the shade sheet wraps around the piping member. A two-ply construction results directly outside the guide groove slot.

Accordingly, the shade sheet wraps around the provided piping member inside each guide rail. The wrapping of almost 180° produces a retaining strength that prevents sagging of the shade sheet between the guide rails. The shade sheet remains to a large extent tightened between the guide rails. The piping members should be sufficiently rigid so as to prevent unwanted torsion.

When the shade sheet is retracted, the wrapping around the piping member is eliminated at the end of the guide rail and the shade sheet lies smoothly and flat on the winding shaft.

In order to maintain the necessary transverse tension in the shade sheet for the roll-up shade according to the invention, no thickened sections are required to keep the shade sheet in the guide rails. The necessary "thickened sections" along the edges are produced dynamically when the shade sheet is deployed and are eliminated just as dynamically when it is again retracted. The roll body of shade sheet material produced on the winding shaft is perfectly smooth and cylindrical. The shade sheet can be rolled up as an evenly thick film. Upon rolling, there is no risk of getting folds in the roll body that later produce ugly creasing.

In addition, the roll-up shade of the invention is very simple to produce because a simple rectangular shade sheet cut is all that is needed. The edges need not be provided with any special elements.

If the inlet edge of the shade sheet has an approximately helical contour, advantageous force conditions in the sheet are produced. The inlet edge can begin at the exterior of the groove slot and be farthest away from the winding shaft at that point. From there, the inlet edge can extend in the direction of the winding shaft to a point of the groove chamber remote from the groove slot in such a manner that only one side of the groove slot and half of the groove chamber are still present in the proximity of the winding shaft.

If necessary, it can be advantageous if the piping member is torsionally rigid relative to the forces arising in operation. In such a case, the piping member is prevented from torsional movements due to the forces arising when the shade sheet runs into the guide rail. Otherwise stress peaks in the shade sheet due to vibrations could locally cause the piping member to turn, which could cause the shade sheet to be pulled out of the guide rail.

It is expedient if the piping members are rough on the outer circumference, in order to obtain as good a friction as possible between the shade sheet and the piping member. The rough surface can be formed by radially projecting hair or bristles. The piping member in question can be varied in diameter, in order to adjust itself automatically to the space conditions inside the guide rail when the shade sheet wraps around the piping member.

A relatively low level of overall stress on the shade sheet can result if the piping member has a circular cross-section and is adapted to the circular cross-section of a preferably cylindrical groove chamber. Tearing of the piping member out of the guide rail can be prevented if the circular cross section of the piping member is always greater than the width of the groove slot.

If the roof window shade is to be operated electrically rather than manually, the piping members can also be used as driving components for the pull rod. For this purpose, the piping members can be formed as flexibly elastic racks, which are preferably provided with a circumferential helical gearing. The gear motor, in turn, can bear a crown gear with teeth complementary to the teeth of the piping member on its output shaft.

When the shade sheet is being deployed, a continuously progressing reshaping appears on the respective side of the shade sheet at the diagonal inlet edge of the guide rail. The originally flat shade sheet is continuously folded over, similar to a seam on a piece of textile, with the piping member becoming wrapped by the edge at the same time. The material of the shade sheet must be adapted to these conditions so that it does not become creased. For this purpose, the shade sheet material must not have a consistency similar to paper in regard to its folding and bending characteristics. Rather the shade sheet should resemble a fabric in its fold-over behavior. Such a shade sheet can consist, for example, of a perforated plastic film or a warp knit.

The guide rail can also consist of a material that is rigid to flexing or be fastened in a manner resistant to bending inside the vehicle body.

The description of illustrative embodiments below includes the aspects needed for understanding the invention. Additional details not described can be inferred by a person skilled in the art in the usual manner from the drawings and description. It is clear that a number of modifications are possible.

The following drawings are not necessarily to scale. The size of certain areas may be exaggerated in the drawing in order to illustrate essential details. Moreover, the drawings are simplified and do not necessarily contain every detail present in a practical implementation.

DETAILED DESCRIPTION OF THE INVENTION

Figure 1:
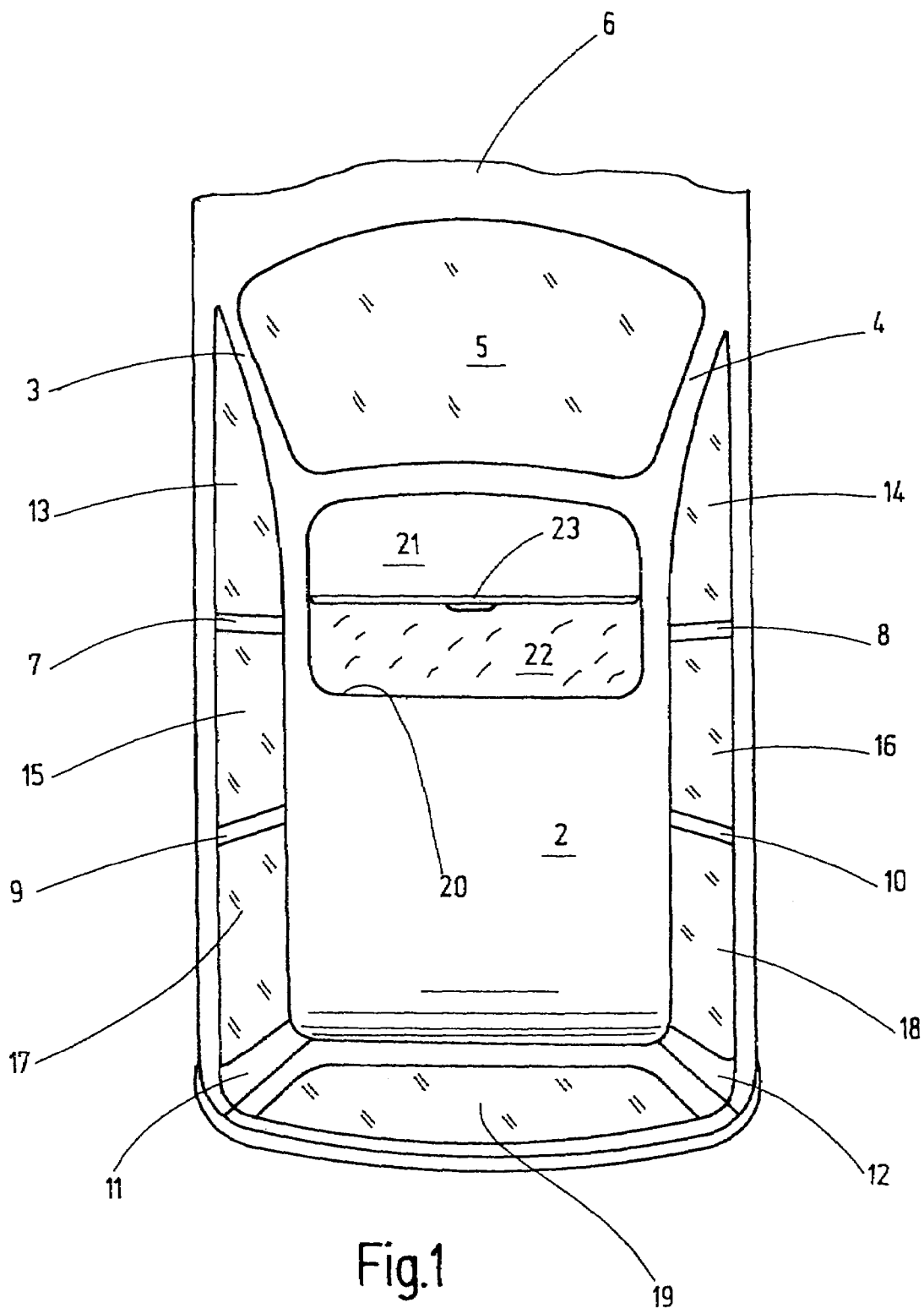
FIG. 1 is a plan view of an illustrative passenger car having a sunroof with a shade according to the present invention.

Referring to FIG. 1, an illustrative passenger vehicle 1 is shown. The vehicle 1 includes a roof 2. Two A-columns 3 and 4 proceed from the front edge of the roof 2. A windshield 5 is arranged between the two A-columns 3 and 4 that transitions at its underside into a hood 6. B-columns 7 and 8, C-columns 9 and 10 as well as D-columns 11 and 12 are provided to the rear of the A-columns 3 and 4. The front side windows 13, 14, rear side windows 15, 16 and luggage compartment side windows 17, 18 are arranged between the various columns. A back window 19 that is arranged between the two D-columns 11, 12 defines the end.

A roof opening 20, in which there is a sunroof window 21, is contained in the front part of roof 2 adjacent to windshield 5. The sunroof window 21 can be a sliding glass roof, a push-up glass roof or it can be a glass roof that combines the two functions.

A partly deployed shade sheet 22 is arranged underneath the glass roof 21. The shade sheet 22 is fastened to a pull-out rod 23. The shade sheet 22 and pull-out rod 23 are part of a manually operated roll-up sunroof shade 24.

Figure 2:
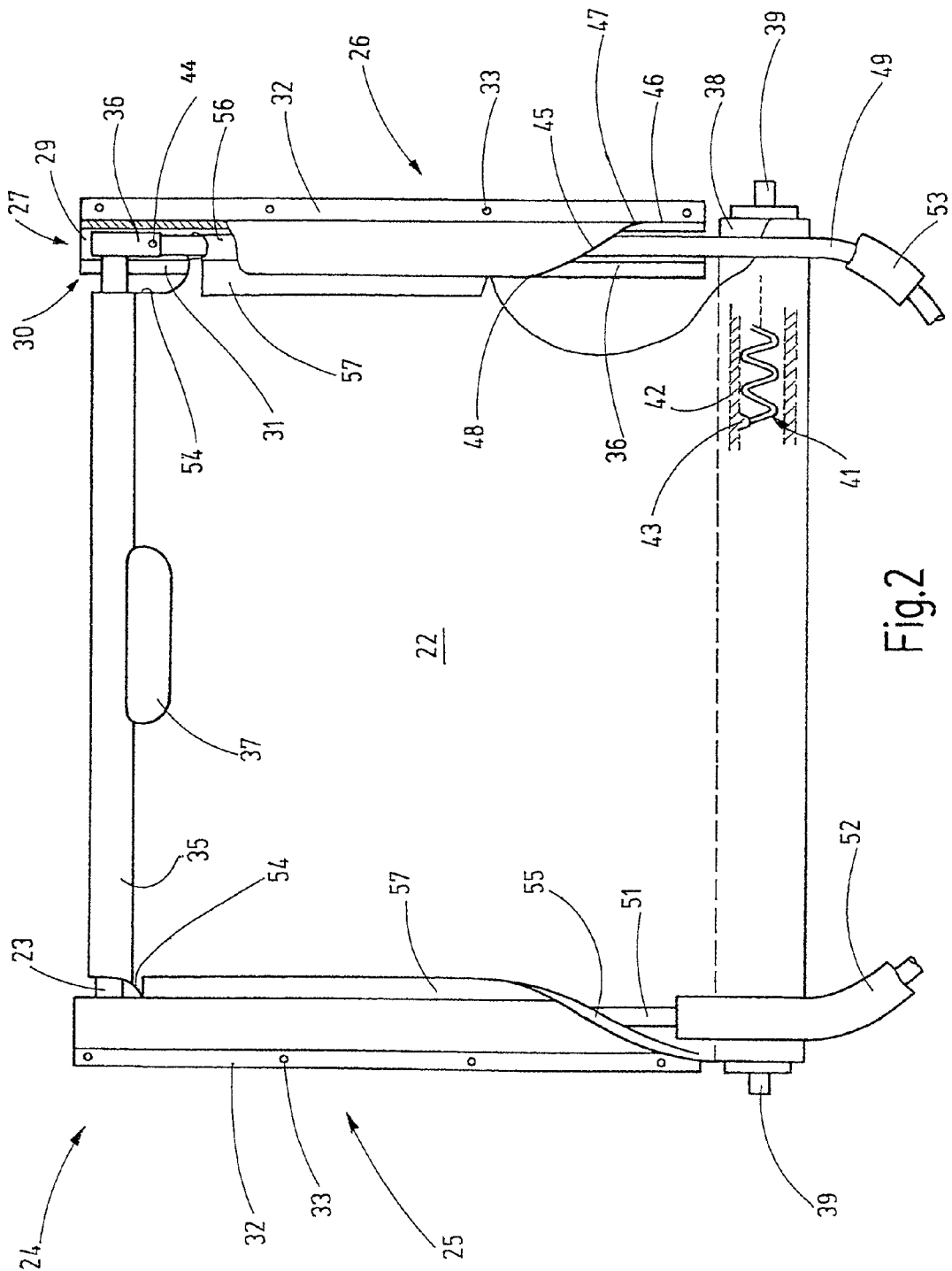
FIG. 2 is a partially cut away schematic plan view of the roll-up sunroof shade according of FIG. 1.

The fundamental structure of the roll-up sunroof shade 24 is shown in FIG. 2. As shown in FIG. 2, two guide rails 25 and 26 are provided at the sides of the sunroof 21. The guide rails 25, 26 run parallel to one another. The guide rails 25 and 26 are arranged mirror-inverted relative to one another, and follow the profile of the lateral edge of the sunroof 21.

Since the two guide rails 25 and 26 are identical, the internal structure of only one guide rail 26 need be described. The description also applies to the other guide rail 25. An undercut guide groove 27, whose profile consists of a groove chamber 29 and a groove slot 30, is situated in the guide rail 26. One of the two side walls 31 of the groove slot 30 in the cut away area of FIG. 2. The width of the slot 30 is smaller than the width of the groove chamber 29, which produces the undercut structure.

On their back side, the guide rails 25, 26 bear mounting flanges 32 with mounting openings 33. The guide rails 25, 26 are mounted underneath the roof 2 in the passenger car via the mounting openings 33. The two guide rails 25 and 26 serve to guide the pull rod 23 to which one edge of the shade sheet 22 is fastened. The central part of the pull rod 23 lies in, for example, a tube-like loop 35 in the shade sheet 22.

The pull rod 23 projects at its longitudinal ends through the groove slot 30 into the guide groove 29 and carries sliders 36, each of which runs in an associated groove chamber 29. To operate roll-up the sunroof shade 24, a central gripping opening 37 is provided in the shade sheet 22 adjacent to the pull rod 23.

The end of shade sheet 22 remote from pull rod 23 is fastened to a winding shaft 38. The winding shaft 38 is rotatably seated by pins 39 alongside the rear ends (relative to the vehicle) of the two guide rails 25 and 26. The winding shaft 38 is tubular in the customary fashion, and contains a schematically shown spring motor 41. The spring motor 41 is formed by a helical tensile spring 42 fastened at 43 to the inside of the pipe constituting the winding shaft 38 and, at the other end, to the right pin 39, which is fixed in the car body. The winding shaft 38 is biased by the spring motor 41 in the direction in which the shade sheet 22 is rolled onto winding shaft 38, and thus maintains the necessary tension in the shade sheet 22.

At the end adjacent to the winding shaft 38, each of the two guide rails 25, 26 is provided with a helically extending inlet edge 45. The inlet edge 45 is created by removing the respective guide rail 25, 26 from the side turned towards the viewer of the Figures, up to approximately the center of guide chamber 29. In the area between the inlet edge 45 and the end adjacent to winding shaft 38, a slot wall 31 as well as half of the interior of groove chamber 29 and its wall 46 is shown.

The inlet edge 45 is roughly helical in shape. The end 47 of the inlet edge 45 that is farthest away from shade sheet 22 is closest to the winding shaft 38, and the end 48 of the inlet edge 45, which finally issues into groove slot 30, is farther away from the winding shaft 38.

The shade 24 further includes two round piping members 49 and 51, whose diameter is somewhat smaller than the diameter of the groove chamber 29. The two piping members 49 and 51 are flexibly elastic, and preferably have a rough, brush-like surface formed, for example, by a plurality of fine hairs or bristles. In relation to the forces occurring in this application, the piping members 49, 51 are sufficiently resistant to compression and tension, and are also torsion-resistant. The piping members 49, 51 are otherwise shaped such that, once advanced into the groove chamber 29, they can in no case be pulled out or pressed out of the groove slot 30. In the simplest case, they can be an appropriately thick polymer wire.

As shown in the broken-open portion of FIG. 2, the front side of the piping members 49 and 51 is connected in a manner resistant to tension and compression to slider 36 with the aid of a rivet 44. The slider 36 has the shape, for example, of a tube into which piping member 49 fits. Outside the guide rails 25, 26, the two piping members 49 and 51 run in storage tubes 52 and 53. The storage tube 52, 53 can be flexible tubes of elastomeric material or also fixedly mounted aluminum pipes.

An important aspect of the novel roll-up sunroof shade 24 is the characteristic that the cut of shade sheet 22 is broader than the distance between the two guide rails 25, 26. The exact width of the shade sheet follows from the following description of the operation of the shade. In this case, appropriate constructional measures ensures that the window shade 24 can be opened only until a cutout 54 provided in the shade sheet in the proximity of the pull rod 23 is slightly behind the end 48 of the inlet edge 45, as viewed from the winding shaft 38. Since the shade sheet 22 is broader than the clear distance between the two guide rails 25, 26, the laterally projecting area of shade sheet 22 is forced by the helically running inlet edge 45 at each guide rail 25, 26, to wrap itself helically around the respective piping member 59, 51, as shown on the left half of FIG. 2 at 55. The shade sheet 22 is forced there into an edge-wrapped position. This creates a tubular loop 56 with an adjoining flat flange section 57 running along the edge of the shade sheet 22, which section exits from slot 30. The tubular wrapping of the piping member 49 by the tubular loop 56 is visible at the upper right in FIG. 2 in the broken open area of the guide rail 26. The position of the shade sheet 22 is illustrated in the profile it assumes if the guide rail 26 were complete there rather than being broken away Starting from this position of the roll-up sunroof shade 24, the user can close the sunroof shade 24 by grasping the pull rod 23, situated at the rear edge 20, in the area of the grip opening 37 and moving it in the direction of the front edge of the sunroof 21. The shade sheet 22 is increasingly unrolled from the winding shaft 38 against the force of the spring motor 41. As the shade sheet 22 is pulled off further, its lateral areas also run into the two guide rails 25 and 26. The above-described tubular configuration in the lateral areas of the shade sheet 22 is progressively produced by screw-shaped or diagonally running inlet edges 45.

Since the two piping members 49 and 51 are connected, in a manner resistant to tension and compression, at their respective ends to the associated slider 36, they are increasingly pulled synchronously with the movement of the shade sheet 22 into the two guide rails 25 and 26, so that the developing edge-wrap is filled everywhere by a piping member 49, 51.

When the roll-up sunroof shade 24 is completely closed, the pull rod 23 is at the front end of the sunroof 21, i.e. in the proximity of windshield 5. The shade sheet 22 is folded over by almost 180° like an edge-wrap over the entire length of its two lateral edges between the pull rod 23 and the distal end 48 of the inlet edge 45. In its side areas, the shade sheet 22 has roughly the shape of a dress seam with inserted piping, except that the seam is not stabilized by stitches.

In the area of the guide slide 30 and outside the guide groove 27, the shade sheet 22 is in two plies, as shown in the figures. Inside the guide groove the shade sheet wraps around the respective piping member 49, 51. The wrapping of the respective piping members 49, 51 ensures that it is not possible to pull the shade sheet 22 transversely out of the guide groove 27. The friction between the piping member 49, 51 and the surrounding shade sheet 22 is able to withstand such forces. With an appropriate frictional engagement, the shade sheet 22 would be more likely to tear than be withdrawn. In addition, when a radially flexible piping member is used, the shade sheet 22 is pressed slightly against the side wall of the groove chamber 29 by hair or bristles, for example, which additionally increases the friction. The anchoring of the roll-up sunroof shade 24 at its lateral edges according to the invention prevents the shade 24 from sagging in the middle.

Those skilled in the art will appreciate that materials that can carry out the edge-wrapping motion at the inlet edge 45 without tearing or becoming permanently creased should be considered as materials for the shade sheet. Any type of plastic film, fabric or warp-knit is suitable.

For opening, the user pushes the pull rod 23 in the direction towards the winding shaft 38. In the process, the piping members 49 and 51, which are sufficiently compression-resistant, are pushed back out of the two guide rails 25, 26 and at the same time, the spring motor 41 correspondingly rolls up the shade sheet 22 on the winding shaft 38.

The friction that the lateral edges of the shade sheet 22 experience in the guide rails 25, 26 is sufficient to prevent the spring motor 41 from rolling up the blind sheet 22 when the user lets go of the pull rod 23. The arrangement according to the invention does not require special braking devices.

As the blind sheet exits from the guide rail 25, 26 and passes the inlet edge 45, it flips back from the edge-wrapped configuration into the flat configuration and lies flat and stretched, as shown in the drawing, on the winding shaft 38 or the area of the plies of shade sheet material thereon.

The roll of shade sheet material that arises from the opening of the roll-up sunroof shade 24 is smooth. At no point is material doubled over.

Figure 3:
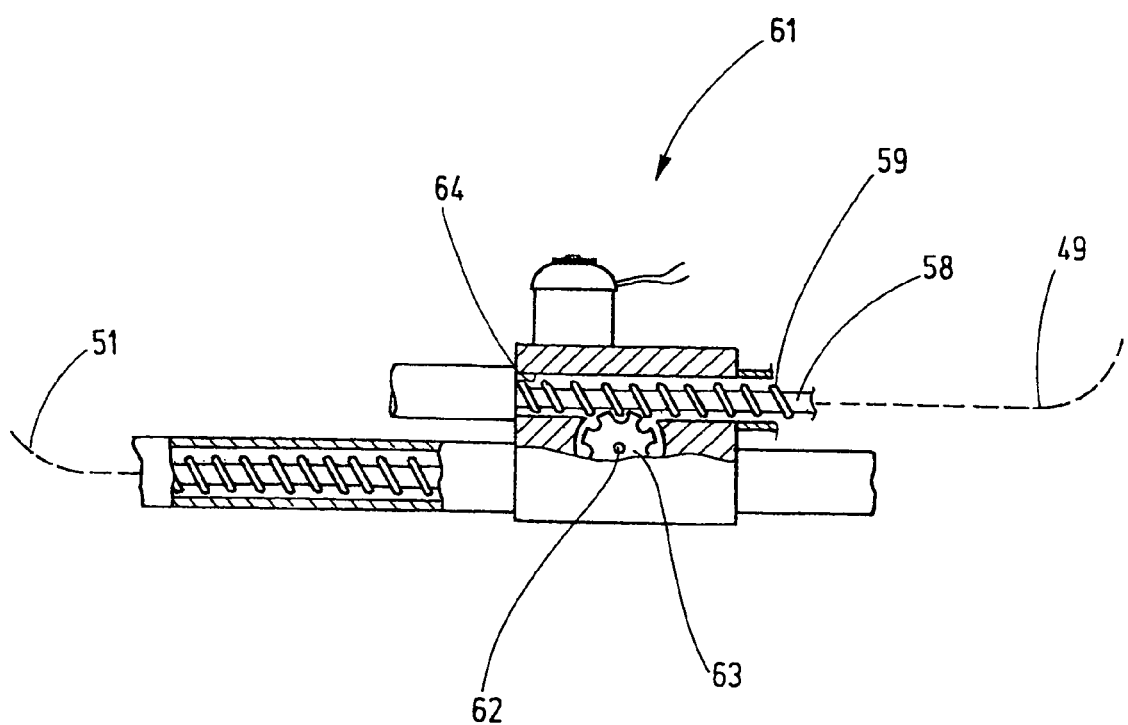
FIG. 3 is a partially cut away schematic plan view of an electric drive for the roll-up sunroof shade of FIG. 2.

The roll-up sunroof shade 24 was described above as a manual shade. The roll-up sunroof shade 24 can also be operated electrically. For this purpose, it is sufficient if the two piping members 49 and 51 are constructed as helically geared racks, as shown schematically in FIG. 3. They include a cylindrical core 58 and a helically running coil 59 mounted thereon. The coil 59 forms a kind of endless teething running around core 58, which overall brings about a toothed rack with circumferential helical gearing.

A gear motor 61 having an output shaft 62 on which a crown gear 63 is fixedly seated is provided for power. The gear 63 carries a frontal gearing that is complementary to the gearing formed by the coil 59.

Two straight through-holes 64, diametrically opposite one another relative to an axis of rotation 62, run through the gear casing of the gear motor 61 tangentially past the gear 63. One of the piping members 49, 51 runs through each of the two boreholes 64. When the output gear 63 is set in rotation, the two piping members 49 and 51 are either pulled out of the guide grooves 25, 26 or pushed into them. The pull rod 23 is moved along with them. It is understood that the two piping members 49 and 51 are run in a buckle-free manner in guide tubes up to the gear motor 61.

Apart from the fact that the shade sheet 22 is driven by way of the piping members, the mode of operation with regard to the behavior of shade sheet 22 when passing the inlet edge 45 is otherwise the same as above.

A roll-up sunroof shade is provided that includes two guide rails running along the sides of the shade sheet. The shade sheet is cut wider than corresponds to the clear distance between the guide rails. While being pulled out, the shade sheet is forced by an appropriate geometry at the inlet end of the guide rails to form a tube-like loop around a piping member that moves along with it. Due to the wrapping of the piping member, the shade sheet is held in place perpendicular to the longitudinal extent of the guide rail.

The invention claimed is:

1. A roll-up window shade for a motor vehicles comprising:
a rotatably seated winding shaft;
a shade sheet having a rectangular shape and having a first edge fastened to the winding shaft;
a pull rod that is connected to a second edge of the shade sheet remote from the winding shaft;
said pull rod being movable between a retracted position adjacent said winding shaft and a sheet shade extended position away from said winding shaft;
first and second guide rails that run parallel to one another on either side of shade sheet when the shade sheet is in an extended position, each guide rail including an undercut guide groove whose cross-section includes a guide chamber and a guide slot; and
first and second piping members with the first piping member extending in the guide chamber of the first guide rail and the second piping member extending in the guide chamber of the second guide rail, each piping member being compression and tension resistant and substantially cylindrical;

said first and second guide rails each having an inlet edge that runs at an incline to a longitudinal axis of guide rail at an end of the respective guide rail adjacent to the winding shaft, and said first and second guide rails being spaced apart from each other a distance less than a width of shade sheet such that upon movement of said pull rod from retracted to said extended position the shade sheet is forced by the inlet edges to wrap around the piping member in frictional engagement therewith;

and each said piping member being connected to the pull rod in a compression resistant manner such that said pull rod is operable for pushing the pull rod to said shade sheet extended position with the shade sheet in such wrapped condition.

2. The shade according to claim 1, wherein the inlet edge has a helical profile.

3. The shade according to claim 1, wherein each said guide rail defines a groove chamber with a side opening groove slot, and said inlet edge begins at an outer side of the groove slot where the inlet edge on a side opposite the winding shaft, the inlet edge extending from the outer side of the groove slot in a direction towards the winding shaft and to a point of the groove chamber remote from the groove slot in such a manner that in the vicinity of the winding shaft by the groove slot, only a first side of the groove slot and one half of the groove chamber is present.

4. The shade according to claim 1, wherein each of the piping members is torsionally rigid relative to forces occurring in operation of the shade.

5. The shade according to claim 1, wherein each piping member has an outer periphery that is rough.

6. The shade according to claim 5, wherein the rough outer periphery is formed by radially projecting hairs or bristles.

7. The shade according to claim 3, wherein each piping member has a circular cross section.

8. The shade according to claim 7, wherein an outer diameter of each piping member is larger than a width of groove slot.

9. The shade according to claim 1, wherein the piping members form drive members for the pull rod.

10. The shade according to claim 1, wherein each of the piping members comprises a flexibly elastic rack.

11. The shade according to claim 1, wherein each of the piping members has a circumferential gearing.

12. The shade according to claim 10, further including a gear motor having an output shaft on which an output gear with a gearing complementary to the gearing on the piping members is seated.

13. The shade according to claim 1, wherein the shade sheet comprises a material that starting from a state in which it is lying flat can be transformed in an edge area into an edge-wrapped state by a continuous edge-wrapping motion.

14. The shade according to claim 1, wherein the shade sheet comprises a plastic film.

15. The shade according to claim 1, wherein the shade sheet comprises a plastic film that is stretchable to a limited extent.

16. The shade according to claim 1, wherein the shade sheet has material properties similar to a woven fabric with respect to bending behavior.

17. The shade according to claim 1, wherein each guide rail is resistant to bending.

18. The shade according to claim 1, wherein each guide chamber has a circular cross section.

19. The shade according to claim 1, wherein opposing ends of the pull rod frictionally engage in the guide rails.

20. The shade according to claim 1, including a motor for moving said piping members and pushing said pull rod to said extended position, and a spring motor operatively connected to the windup shaft for rotating the windup shaft in a windup direction upon movement of the pull rod and shade sheet to the retracted position.

\* \* \* \* \*